US009661183B2

(12) United States Patent
Cho et al.

(10) Patent No.: US 9,661,183 B2
(45) Date of Patent: May 23, 2017

(54) IMAGE CORRECTION APPARATUS AND METHOD

(71) Applicant: SINDOH CO., LTD., Seoul (KR)

(72) Inventors: Nam Ik Cho, Seoul (KR); Byoung Bag Lee, Seoul (KR); Cheol Ho Ohk, Seoul (KR)

(73) Assignee: SINDOH CO., LTD., Seoul (KR)

( * ) Notice: Subject to any disclaimer, the term of this patent is extended or adjusted under 35 U.S.C. 154(b) by 0 days.

(21) Appl. No.: 14/793,867

(22) Filed: Jul. 8, 2015

(65) Prior Publication Data

US 2016/0088188 A1   Mar. 24, 2016

(30) Foreign Application Priority Data

Sep. 23, 2014 (KR) .................... 10-2014-0126709

(51) Int. Cl.

| | |
|---|---|
| *G06T 5/00* | (2006.01) |
| *H04N 1/46* | (2006.01) |
| *G06K 9/40* | (2006.01) |
| *H04N 1/409* | (2006.01) |

(52) U.S. Cl.

CPC ... *H04N 1/4097* (2013.01); *H04N 2201/0458* (2013.01)

(58) Field of Classification Search

None
See application file for complete search history.

(56) References Cited

U.S. PATENT DOCUMENTS

| | | | | |
|---|---|---|---|---|
| 5,436,979 A | * | 7/1995 | Gray | .................. G06T 5/20 348/92 |
| 5,969,372 A | * | 10/1999 | Stavely | ............ G01N 21/8806 250/559.42 |
| 6,618,512 B1 | * | 9/2003 | Yamaguchi | .......... G06T 7/0004 382/319 |
| 7,020,346 B2 | * | 3/2006 | Dupont | .................. G06T 5/005 348/E5.049 |
| 7,113,619 B1 | * | 9/2006 | Matama | ........... H04N 1/00267 382/112 |
| 7,183,532 B2 | * | 2/2007 | Gann | .................... G01N 21/94 250/214 C |
| 7,408,569 B1 | * | 8/2008 | Yamaguchi | ............ G03B 27/73 348/125 |

(Continued)

FOREIGN PATENT DOCUMENTS

| | | |
|---|---|---|
| JP | 2011-049969 | 3/2011 |
| JP | 2001-257877 | 9/2011 |

*Primary Examiner* — Madelein Nguyen
(74) *Attorney, Agent, or Firm* — Nixon & Vanderhye P.C.

(57) ABSTRACT

The present disclosure relates an image correction apparatus and method. The image correction apparatus includes a printing unit for printing an image; a scratch detecting unit which detects a scratch region from a scan image scanned per line; and a restoration processing unit which performs the restoration of the scratch region by interpolation if the width of the scratch region detected by the scratch detecting unit is less than a predetermined value and, if the width thereof is not less than the predetermined value, does not perform a restoration of the scratch region but provides the printing unit with the scan image, thereby correcting an image distortion by easily detecting an image distortion due to foreign matter.

6 Claims, 9 Drawing Sheets
(6 of 9 Drawing Sheet(s) Filed in Color)

(56) References Cited

U.S. PATENT DOCUMENTS

| | | | |
|---|---|---|---|
| 7,424,170 B2* | 9/2008 | Steinberg | G06K 9/346 348/E5.081 |
| 7,826,675 B2* | 11/2010 | Kisilev | G06T 5/30 382/257 |
| 8,248,662 B2 | 8/2012 | Seo | |
| 8,369,650 B2* | 2/2013 | Zamfir | H04N 5/217 382/173 |
| 2002/0048411 A1* | 4/2002 | Takayama | G06K 9/40 382/275 |
| 2002/0071141 A1* | 6/2002 | Katakura | H04N 1/02409 358/474 |
| 2002/0131094 A1* | 9/2002 | Koshimizu | H04N 1/00092 358/509 |
| 2002/0168116 A1* | 11/2002 | Takayama | H04N 1/40056 382/275 |
| 2003/0053158 A1* | 3/2003 | Tsuji | H04N 1/4097 358/518 |
| 2003/0103212 A1* | 6/2003 | Westphal | A61B 3/102 356/479 |
| 2003/0128873 A1* | 7/2003 | Bronson | H04N 1/4097 382/163 |
| 2003/0150918 A1* | 8/2003 | Nogami | H04N 1/00002 235/454 |
| 2004/0240751 A1* | 12/2004 | Kita | H04N 1/4097 382/275 |
| 2005/0213838 A1* | 9/2005 | Kuramoto | H04N 1/4097 382/254 |
| 2005/0280867 A1* | 12/2005 | Arai | H04N 1/00013 358/2.1 |
| 2006/0110009 A1* | 5/2006 | Klassen | G06T 7/001 382/112 |
| 2007/0122056 A1* | 5/2007 | Steinberg | G06K 9/346 382/275 |
| 2009/0180134 A1* | 7/2009 | Ikari | H04N 1/4097 358/1.14 |
| 2011/0149331 A1* | 6/2011 | Duggan | G06K 9/036 358/1.14 |

\* cited by examiner (a) SCRATCH EXTRACTION REGION - RED REGION    (b) SIGNAL OF MEAN LINE (c) SIGNAL OF MEAN LINE (VISUALIZATION)

ridge     first derivative of Gaussian     filter response (a)

(b)

(c)

(d)

IMAGE CORRECTION APPARATUS AND METHOD

This application claims priority to Korean Patent Application No. 10-2014-0126709 filed Sep. 23, 2014, the entire content of which is hereby incorporated by reference.

BACKGROUND OF THE INVENTION

Field of the Invention

The present invention relates to an image correction apparatus and method, and more particularly, to an image correction apparatus and method capable of detecting an image distortion due to foreign matter and correcting a distorted image.

Description of the Related Art

An image scanner obtains an image per line by illuminating a light on an object to be scanned while a light source consisting of not a plane but a line is moving; and then allowing an image reflected by the object to pass through a color image sensor. Accordingly, in the process of obtaining the image, the degree of a transmittance and reflectance of light changes due to various reasons such as some pixels of an image sensor break down; foreign matter enters the inside and outside of the scanner in a process step; and dust coming away from the paper sheet stains an image acquisition unit, etc. Therefore, the problems, such as brightness, darkness and color distortion, occur in particular line.

In this way, since the image is scanned per line, a distortion due to foreign matter appears like scratches which may be shown in old film movies. However, as it is not possible to know whether foreign matter exists in inside of a scanner; and whether, in case there is an image distortion including scratches, the image distortion is caused by foreign matter, or the patterns or the stripes which originally exist in scan objects, the distorted image is printed as it is, thus being unavoidably provided to a user.

SUMMARY OF THE INVENTION

To solve the problem described above, an object of the present invention is to provide an image correction apparatus and method capable of detecting an image distortion due to foreign matter and correcting the distorted image.

To solve the problem described above, an image correction apparatus according to one embodiment of the present invention may comprise: a printing unit for printing an image; a scratch detecting unit which detects a scratch region from a scan image scanned per line; and a restoration processing unit which, if the width of the scratch region detected by the scratch detecting unit is less than a predetermined value, performs a restoration of the scratch region by interpolation and, if the width thereof is not less than the predetermined value, does not perform the restoration of the scratch region but provides the printing unit with the scan image.

In a further embodiment, the image correction apparatus further may comprise: a scanning unit which performs a scanning operation per line so as to obtain the scan image; a scratch extraction region setting unit which sets a scratch extraction region on the scan image obtained by the scanning unit; a scratch discriminating unit which discriminates whether there is a scratch in the scratch extraction region set by the scratch extraction region setting unit and, if there is a scratch in the scratch extraction region, then provides a scratch position information to the scratch detecting unit.

In a further embodiment, the scratch discriminating unit may include a Sobel edge detector which may discriminate if a texture originally existing in a scan object is included within the scratch extraction region set by the scratch extraction region setting unit.

In a further embodiment, the scratch detecting unit may include a Gaussian first-derivative filter for performing a scratch detection in the direction parallel to the scan direction of the line.

In a further embodiment, the scratch detecting unit further may comprise: a one-dimensional median filter for supplementing an erroneous scratch detection resulting from the texture originally existing in the scan object at the time of applying a Gaussian first-derivative filter.

In a further embodiment, the restoration processing unit may include a linear interpolator which performs a restoration by linear interpolation which connects linearly predetermined pixel information.

In a further embodiment, the image correction apparatus further may comprise a message provision unit which provides a warning message about foreign matter in case that a printing operation is performed without the restoration of the corresponding scratch region by the restoration processing unit.

In a further embodiment, the image correction apparatus further may comprise a message provision unit which provides a warning message about foreign matter if the width of the scratch region detected by the scratch detecting unit is not less than a predetermined value.

In a further embodiment, the message provision unit may be provided with a continuous print button and may provide the printing unit with the scan image for which the restoration of the corresponding scratch region is not performed when a continuous printing button is inputted.

So as to obtain the object described above, an image correction method according to another embodiment of the present invention may comprise: a scratch detecting step of detecting a scratch region from a scan image scanned per line; a restoration processing step of performing a restoration of the corresponding scratch region by interpolation if the width of the scratch region detected by the scratch detecting unit is less than a predetermined value, or not performing the restoration of the corresponding scratch region by interpolation if the width thereof is not less than the predetermined value; and a printing step of printing a image processed in the restoration processing step on a paper sheet.

In a further embodiment, the image correction method further may comprise: a scanning step of performing scanning per line so as to obtain a scan image; a scratch extraction region setting step of setting a scratch extraction region on the scan image obtained by the scanning step; and a scratch discriminating step of discriminating if there is a scratch in the scratch extraction region set by the scratch extraction region setting step and, if there is a scratch, then providing a scratch position information to the scratch detecting step.

In a further embodiment, the scratch detecting step may detect a scratch by applying a Gaussian first-derivative filter for all lines within a predetermined range having a scratch discriminated in the scratch discriminating step.

In accordance with the features described above, the present invention may correct an image distortion by detecting easily the image distortion due to foreign matter such as dust.

In addition, the present invention may greatly reduce the interpolation error due to an erroneous detection by discriminating whether a scratch resulting from foreign matter or pattern originally existing on a scan object is detected is in a scratch extraction region set at a strip, etc.

In addition, the present invention may prevent a false scratch from being detected due to a texture, etc. by applying a median filtering to a scan image.

Also, the present invention may provide a guide message allowing a user to remove polluted portions when a large scratch difficult to restore by interpolation is detected.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which.

DESCRIPTION OF SPECIFIC EMBODIMENTS

Hereinafter, preferable embodiments of an image correction apparatus and image correction method according to the present invention are described in detail with reference to the accompanying drawings. For reference, when explaining the embodiment of the present invention, the terms which refer to elements of the present invention are referred to considering the functions of the respective elements and should be construed as not limiting the technical elements of the present invention.

Figure 1:
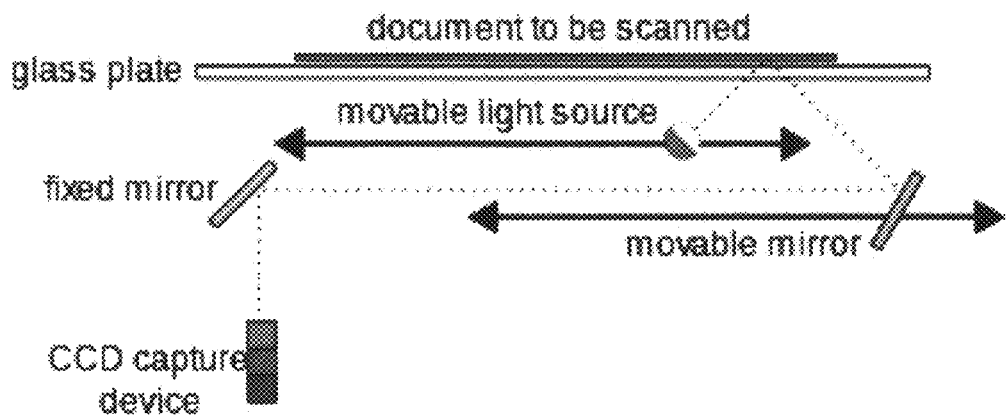
FIG. 1 illustrates an internal configuration of a typical image scanner.
Figure 2:
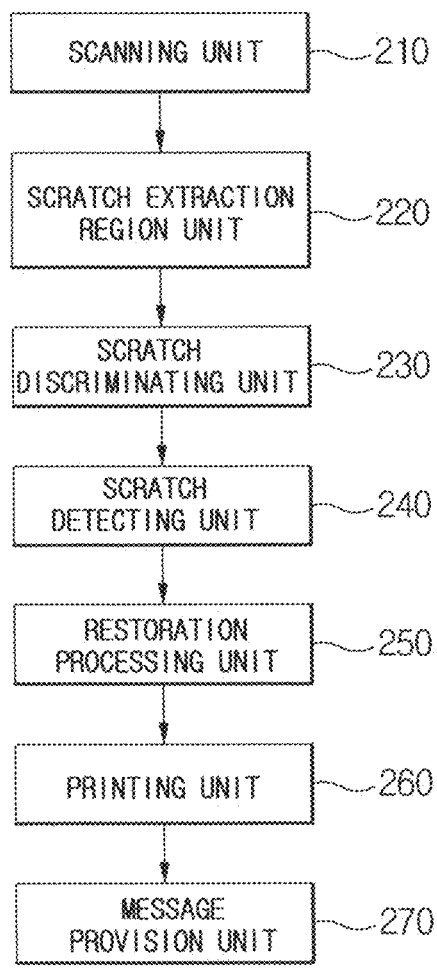
FIG. 2 is a block diagram of an image correction apparatus in accordance with one embodiment of the present invention.

FIG. 2 illustrates a block diagram of an image correction apparatus in accordance with one embodiment of the present invention.

As shown in FIG. 2, an image correction apparatus includes a scanning unit 210, a scratch extraction region setting unit 220, a scratch discriminating unit 230, a scratch detecting unit 240, a restoration processing unit 250, a printing unit 260 and a message provision unit 270.

The scanning unit 210 performs a scanning operation per line to obtain a scan image. The scratch extraction region setting unit 220 sets a scratch extraction region on the scan image obtained by the scanning unit 210.

The scratch discriminating unit 230 discriminates whether scratches are in the scratch extraction region set by the scratch extraction region setting unit 220 and, if there is a scratch, then provides a scan position information to the scratch detecting unit 240. To this end, the scratch discriminating unit 230 may include a Sobel edge detector which may decide whether a texture which a scan object originally has is included in the scratch extraction region.

The scratch detecting unit 240 detects a scratch region from a scan image scanned per line. To this end, the scratch detecting unit 240 may include a Gaussian first-derivative filter which performs the detection of a ridge, etc., for all lines in the direction parallel to the scan direction of the line. In addition, the scratch detecting unit 240 may further include a one-dimensional median filter for supplementing the erroneous scratch detection resulting from the texture at the time of applying a Gaussian first-derivative filter.

If the width of the scratch region detected by the scratch detecting unit 240 is less than a predetermined value, the restoration processing unit 250 performs the restoration operation of a scratch region by interpolation and, if the width thereof is not less than the predetermined value, it does not perform the restoration operation of the scratch region but provides the scan image to the printing unit 260. In order to restore the scratch region, the restoration processing unit 250 may include a linear interpolator which performs a restoration by linear interpolation which connects linearly predetermined pixel information.

When the width of a scratch is too large, a proper restoration may not be fulfilled even if the interpolation is applied. As a result of experimenting with artificial scratches, it was confirmed that the restoration may be realized by the interpolation in case of not more than six pixels. In case of not more than 12 pixels the restoration may be applied, allowing for some degree of error. However, in case of more than 12 pixels, it was preferable that the restoration is not applied since an error is clearly visible to the naked eye.

The printing unit 260 prints an image processed by the restoration processing unit 250, on a paper sheet.

The message provision unit 270 may provide a warning message about foreign matter, in case that the restoration processing unit 250 does not perform the restoration of the scratch region since the width of the scratch region detected by the scratch detecting unit 240 is not less than a predetermined value. To this end, the message provision unit 270 may indicate a warning guide sign to remove pollutant of the scanning unit 201 or request a user to clean a polluted portion.

Also, the message provision unit 270 may indicate the portion of the scanner to be cleaned, together with the wording "please clean the surface of the scanner since the surface of the scanner can be polluted due to dust of a paper sheet, etc." And, in case that a guide message is provided, the message provision unit 270 may again provide a message after a certain period of time or a predetermined use.

Figure 3:
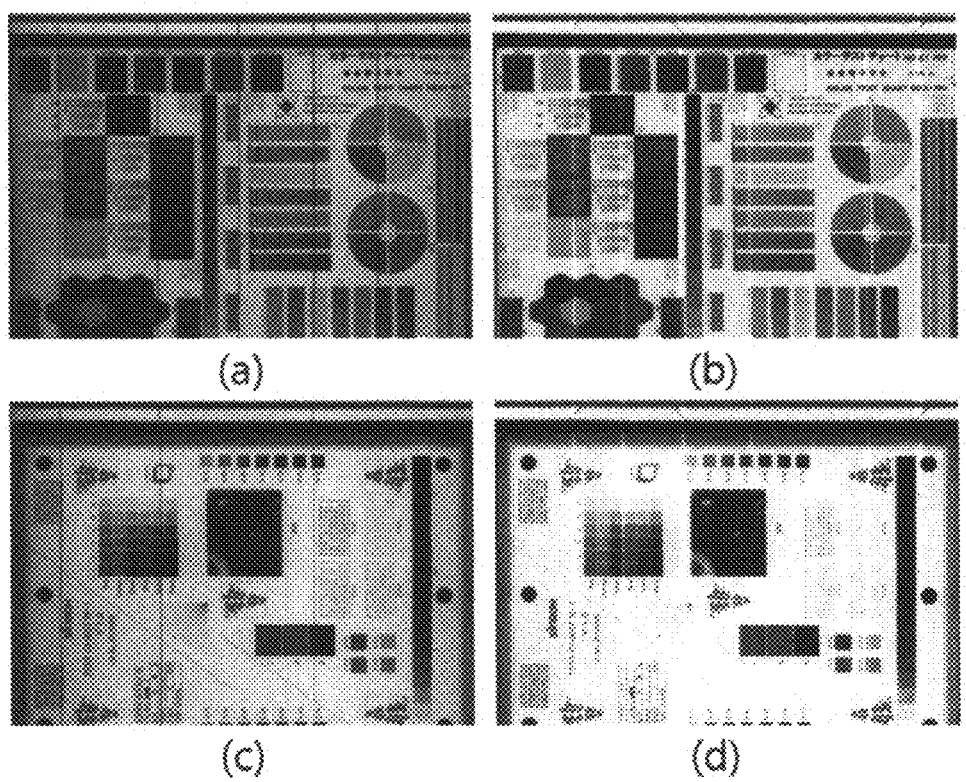
FIG. 3 illustrates examples of scratch phenomenon arising in an image obtained via a scanning unit shown in FIG. 2.
Figure 4:
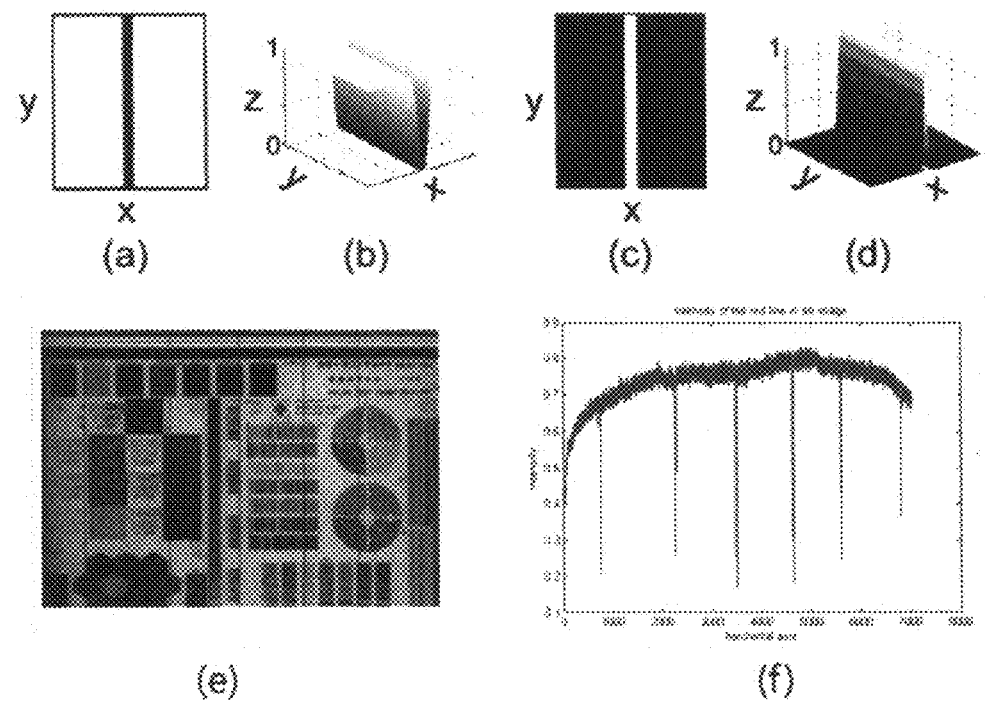
FIG. 4 illustrates signal characteristics of a scratch by means of example.

FIG. 3 illustrates examples of the scratch phenomenon arising in an image obtained via the scanning unit shown in FIG. 2. FIG. 4 illustrates signal characteristics of the scratch by means of examples.

An image obtained via the scanning unit 210 shown in FIG. 3 may also be obtained by scanning a scan object put on a flatbed or by scanning a paper sheet while moving the paper sheet by means of an automatic document feeder (ADF).

Large scratches in a vertical direction may be observed in FIG. 3 wherein they are examples of the scratch phenomenon arising in images obtained via the scanning unit 210. FIG. 3(*a*) is an example of the case where scratches in dark color are generated since light is not properly reflected; FIG. 3(*b*) is an example of the case where scratches in the brighter color than their surroundings are observed; FIG. 3(*c*) is an example of the case where colors themselves as well as the brightness of light are distortedly observed; and FIG. 3(*d*) is an example of the case where the phenomenon that light greatly spreads out may be observed.

In this way, scratches appear as a lighter or darker line than their surroundings and, as can be seen from the graph, appear as a valley or a ridge as shown in FIG. 4. That is, scratches in the darker color than their surroundings appear in the form of valley while scratches in the brighter than their surroundings appear in the form of ridge.

FIG. 4(*a*) represents a valley in an image; FIG. 4(*b*) represents a signal intensity of a valley surface; FIG. 4(*c*) represents a ridge in an image; and FIG. 4(*d*) represents a signal intensity of a ridge surface; FIG. 4(*e*) represents a scan image obtained from the scanning unit 210; and FIG. 4(*f*) is an example of distinctly showing a valley in one-dimensional signal corresponding to one scan line and is a signal of a red line corresponding to the scratch extraction region of FIG. 4(*e*).

As described above, the scratch means that a ridge or valley per line in the horizontal direction is vertically connected. Therefore, in order to detect the scratches, ridge or valley detection should be performed for all lines in the horizontal direction. However, if ridge or valley detection is performed for all lines, there may occur a problem that lines or other texture, etc. within image parallel to the scratches are also detected.

To overcome this problem, the scratch extraction region setting unit 220 sets a region in which a texture does not exist within the document as a scratch extraction region, under the assumption that dust on the image sensor of the scanning unit 210 influences the whole of the scan line. And, the scratch discriminating unit 230 determines whether a scratch exists by allowing a scratch to be detected only in this scratch extraction region.

As in the present invention, even though there is a limitation in that the algorithm for setting a scratch extraction region may be applied only to a scan image in which a strip region exists at the upper end of the scan image when scanning object put on the flatbed or only to a scan image in which textures do not exist at the upper end of a document when scanning by the ADF, if the algorithm is applied to this scan image, the interpolation error due to erroneous detection may be greatly reduced.

Figure 5:
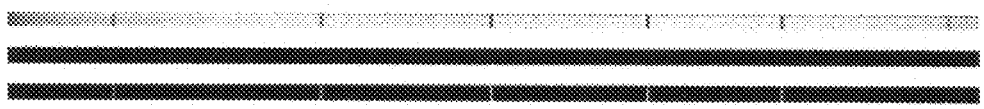
FIGS. 5 and 6 illustrate examples of image detection result in a scratch extraction region by the scratch discrimination unit shown in FIG. 2.
Figure 6:
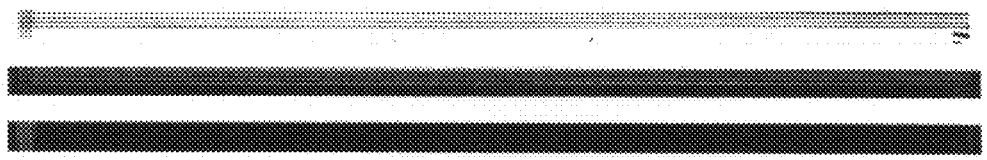
Figure 7:
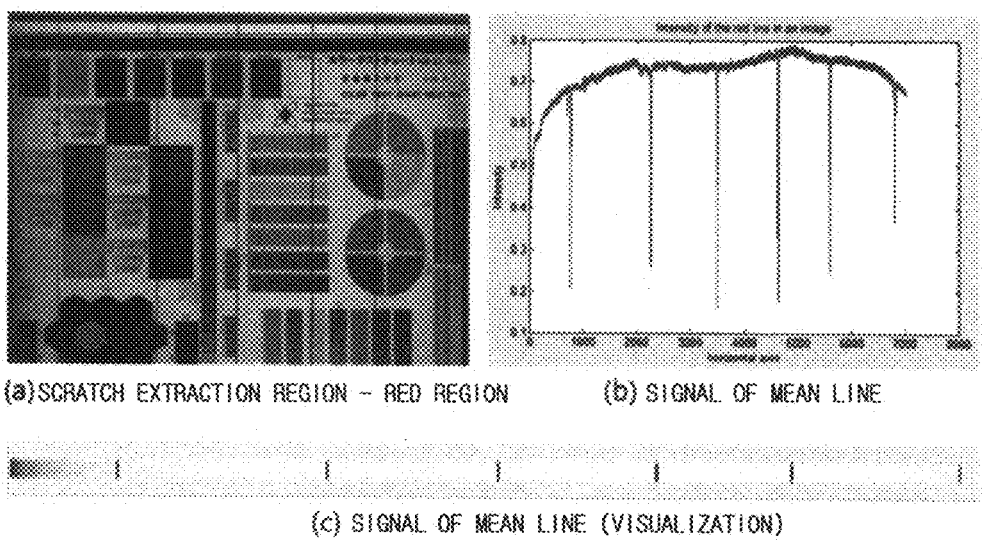
FIG. 7 illustrates an example of average signal of the scratch extraction region.

FIGS. 5 and 6 illustrate examples of image detection result in a scratch extraction region by the scratch discrimination unit shown in FIG. 2. FIG. 7 illustrates an example of an average signal of the scratch extraction region.

The scratch discriminating unit 230 decides whether a texture is included in the scratch extraction region so as to discriminate whether there is a scratch. The fact that there are no textures within the scratch extraction region means an flat image and thus approximately zero value comes out in a gradient image. The scratch discriminating unit 230 includes a Sobel edge detector based on such a feature, and thus may classify the image as being scratch-detectable if the edge is not detected and the image as being scratch-undetectable if the edge is detected.

However, the edge due to the scratch may be detected in this scratch extraction region but this image should be classified as a scratch-detectable image. By applying a differential operator to only the direction parallel to the scan direction, the Sobel edge detector does not detect the edge of scratch direction but only the edge of the direction vertical to the scratch direction and decides it as a texture. For example, FIGS. 5 and 6 respectively show the results of edge detection from an image having scratches in the scratch extraction region and an image not having scratches in the scratch extraction region.

FIG. 5 shows an example of an image not having textures but having only scratches in the scratch extraction region. In the lower figure in which the derivative of the Sobel operator is applied to the horizontal direction, the edges of scratches are detected. On the other hand, in the medium figure in which the derivative of the Sobel operator is applied to the vertical direction, scratches are not detected. FIG. 6 shows an example of an image having textures within the scratch extraction region. It can be confirmed that edges are detected in both the lower figure in which the derivative of the Sobel operator is applied to the horizontal direction and the medium figure in which the derivative of the Sobel operator is applied to the vertical direction.

In case that the scratch discriminating unit 230 performs the detection described above only per scan line, ridges or valleys which can not be detected due to the noise of image itself and the scan noise, etc. may occur. Therefore, it is preferable to perform the algorithm in the way that the results of all lines of the scratch extraction region are averaged.

In FIG. 7(*a*) the scratch extraction region is indicated as red. FIG. 7(*b*) indicates the average value of the scratch extraction region. In FIG. 7(*c*) the average value of the scratch extraction region in FIG. 7(*b*) is visualized. Through FIG. 7(*b*) it can be seen that the average value of the scratch extraction region is less noisy than FIG. 4(*f*) which represents the value of one line.

Figure 8:
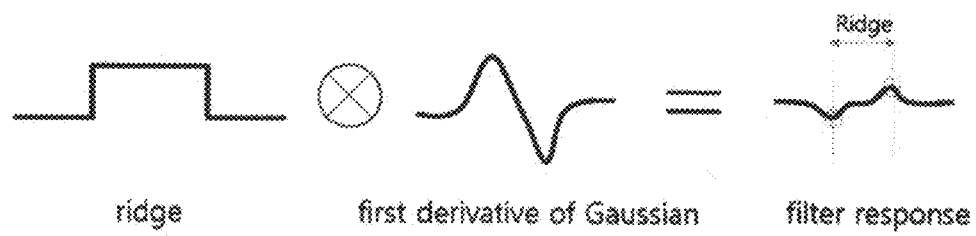
FIG. 8 is a drawing for explaining detection operation of the scratch detection unit shown in FIG. 2.
Figure 9:
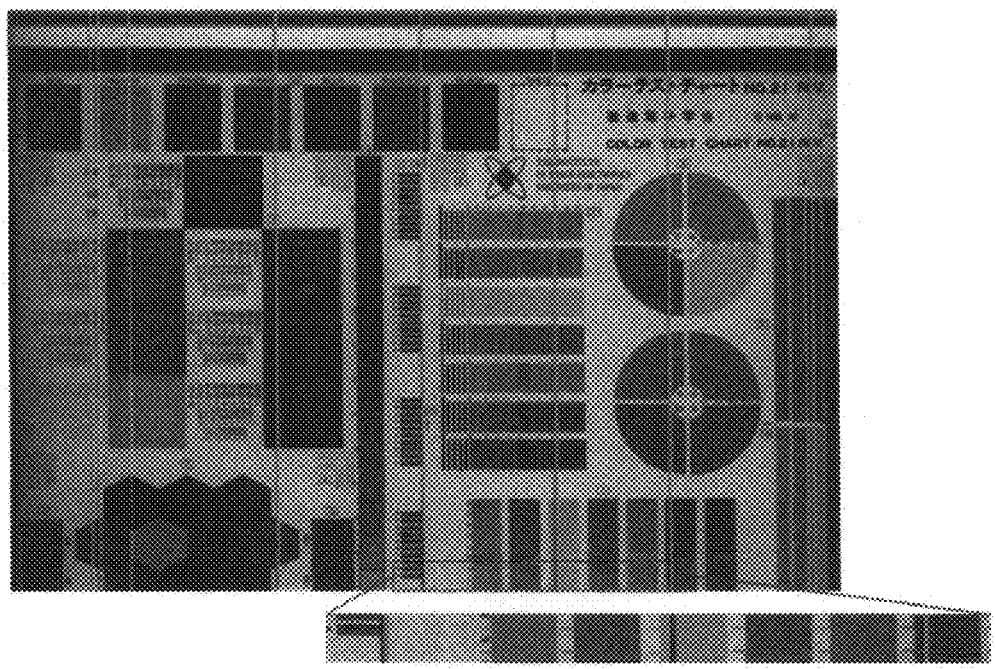
FIG. 9 illustrates an example of detection error generated when the whole images are detected by scratch detection in the scratch extraction region.
Figure 10:
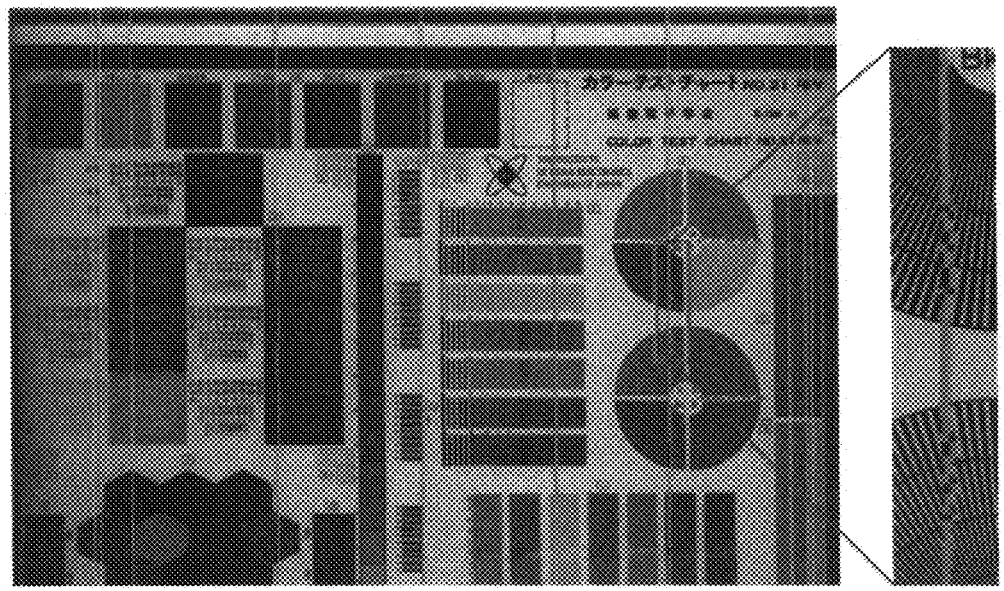
FIG. 10 illustrates an example of error generated in the vicinity of texture when scratch is detected per line.
Figure 11:
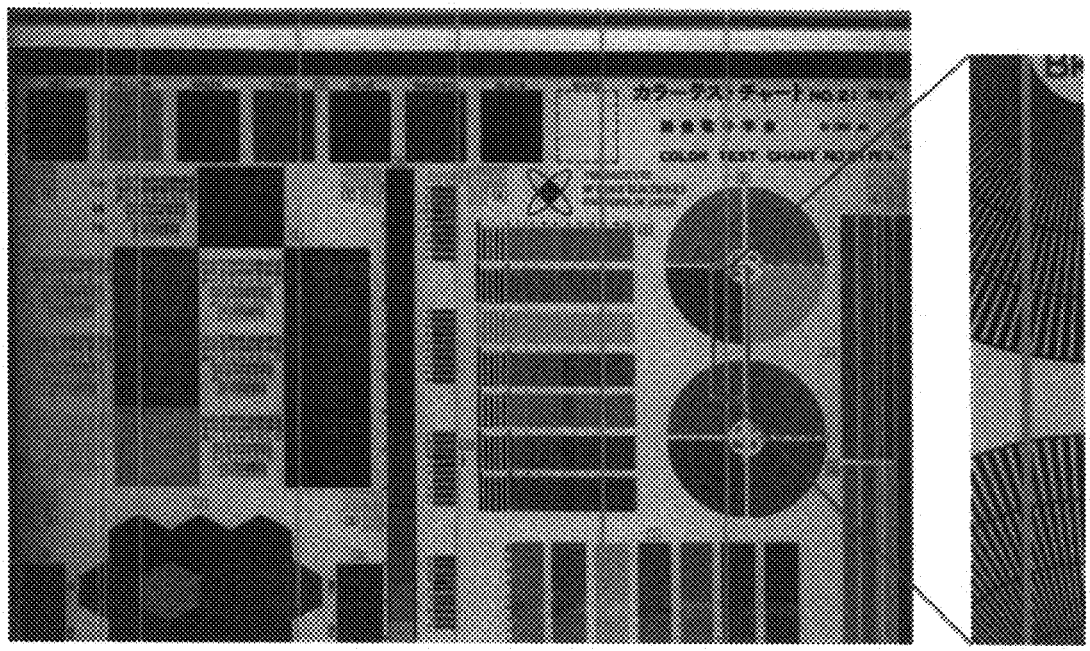
FIG. 11 is an example of an image from which scratch is detected by applying median filtering.

FIG. 8 is a drawing for explaining the detection operation of the scratch detecting unit shown in FIG. 2. FIG. 9 illustrates an example of the detection error generated when the whole scratch extraction region is detected by scratch detection. FIG. 10 illustrates an example of the error generated in the vicinity of textures when scratches are detected per line. FIG. 11 is an example of an image from which scratches are detected by applying a median filtering.

The scratch detecting unit 240 first needs to detect ridges or valleys from the scan line signal of image to detect scratches. The scratch detecting unit 240 may detect ridges or valleys by observing Gaussian first derivative filter response. In FIG. 8 it can be seen that two peaks at which the zero-crossing occurs are detected if an ridge image passes through the Gaussian first derivative filter. The region between the two peaks becomes a ridge.

On the other hand, if the same effect is given in the direction of the scan line by dust, a sufficiently good scratch detection result may be obtained only with the scratch detection of the scratch extraction region. However, in reality, as the paper sheet moves, the dust position may move little by little; the originally existing dust may be detached; a new dust may arise; or a paper skew may occur. Therefore, in reality, as seen in FIG. 9 the phenomenon occurs that for each line, scratches are distorted little by little and the width is changed.

It is preferable to utilize scratch detection information per line in the remaining region except for scratch extraction region such that the scratch detecting unit 240 may fully detect scratches irrespective of these changes. However, as described above, in case that scratches are detected per line the problem occurs that a false scratch is detected due to the influence of textures in the image, as shown in FIG. 10. The scratch detection unit 240 may include a one-dimensional median filter to solve this problem. An image processed by applying a one-dimensional median filter is shown in FIG. 11.

Figure 12:
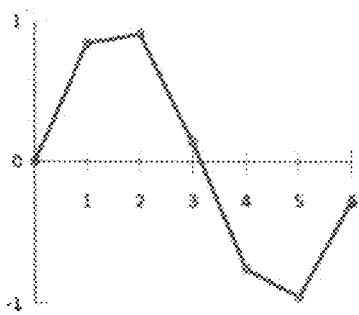
FIG. 12 illustrates examples of the interpolation method applicable to a restoration processing unit shown in FIG. 2.
Figure 12:
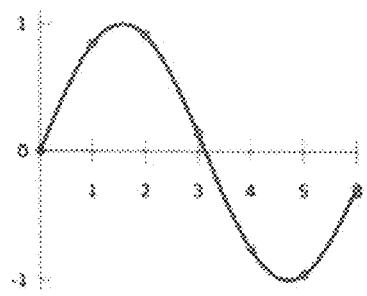
Figure 12:
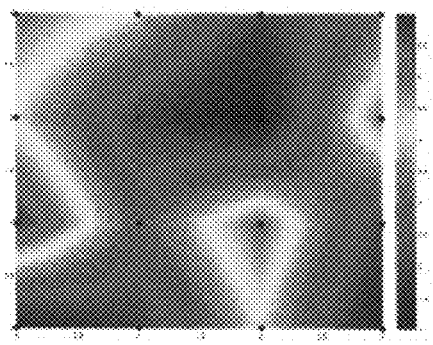
Figure 12:
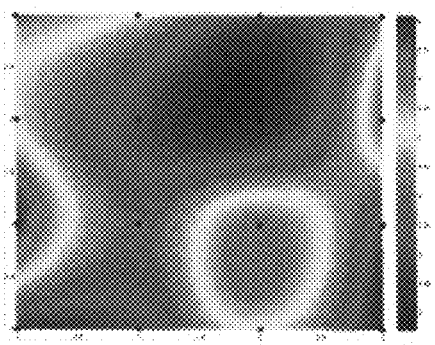
Figure 13:
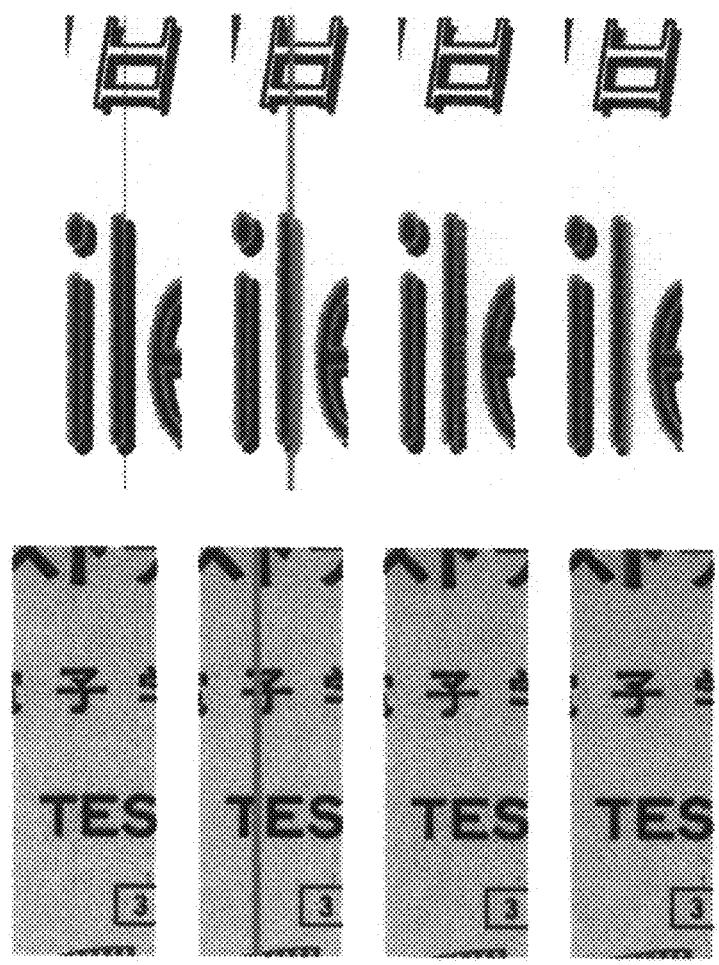
FIG. 13 illustrates examples of scratch restoration according to the present invention.

FIG. 12 illustrates examples of the interpolation method applicable to a restoration processing unit shown in FIG. 2. FIG. 13 illustrates examples of scratch restoration according to the present invention.

When scratches are detected by the scratch detecting unit 240, the restoration processing unit 250 may use bilinear interpolation, or bicubic interpolation so as to restore the scratches. The pixel value generated in bilinear interpolation is the sum of values obtained with multiplying the nearest four pixels by weights and the weights are determined in the linear method. Each weight is inversely proportional to the distance from a pixel for which the interpolation value is to be obtained to the corresponding pixel. On the other hand, since bicubic interpolation is represented by piece-wise 3rd order polynominal function, the corner four pixels and their derivatives are required and thus total 16 pixels are required. Therefore, the interpolated surface obtained by bicubic interpolation may be smoother plane than corresponding surface obtained by bilinear interpolation. However, since ridges are detected per line, the linear interpolation or cubic interpolation using only elements in the horizontal direction is more preferable than the bilinear interpolation or bicubic interpolation using elements in the horizontal direction and the vertical direction.

The present invention deals with the case that scratches occur in the direction vertical to the scan direction. Therefore, linear interpolation or cubic interpolation was performed per line of the horizontal direction. As a result of experiment, linear interpolation was shown to be more excellent than cubic interpolation. In case of cubic interpolation, there is a problem in that the desired ridge information should be restored with different result from the right and left pixels in the situation where the pixel value of the ridge is mostly equal to the right and left pixels. Therefore, it can be seen experimentally that the linear interpolation linearly connecting four pixel information shows better result.

In FIG. 13, the first figure from the left shows a scan image having a scratch. The second figure shows an image from which this scratch is detected. The third figure shows an image corrected by cubic interpolation. The fourth figure shows an image corrected by linear interpolation. Through FIG. 13, it can be also seen that linear interpolation is more effective than cubic interpolation.

Figure 14:
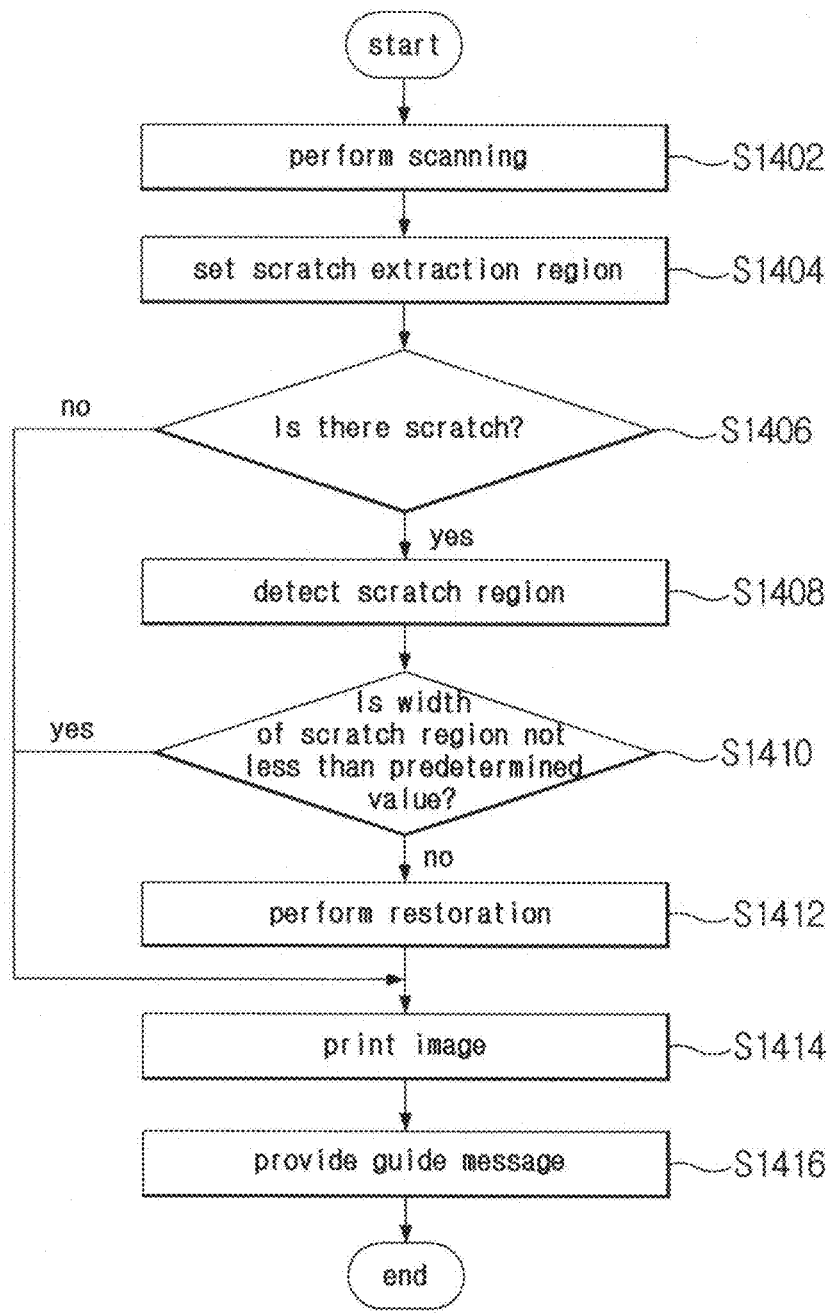
FIG. 14 illustrates a flow chart of an image correction method according to one embodiment of the present invention.

FIG. 14 illustrates a flow chart of an image correction method according to one embodiment of the present invention.

The scanning unit 210 performs a scanning operation per line so as to obtain a scan image (S1402). The scratch extraction region setting unit 220 sets a scratch extraction region on the scan image obtained by the scanning unit 210 (S1404).

The scratch discriminating unit 230 discriminates if there are scratches in the scratch extraction region set by the scratch extraction region setting unit 220 (S1406) and provides a scan image to the scratch detecting unit 240 if there are scratches. To this end, the scratch discriminating unit 230 may include a Sobel edge detector which detects if there are scratches by applying a differential operator to only the direction parallel to the scan direction of the line.

The scratch detecting unit 240 detects a scratch region for all lines within a predetermined range having scratches discriminated by the scratch discriminating unit 230 (S1408). To this end, the scratch detecting unit 240 may include a Gaussian first-derivative filter which performs a ridge detection for all lines of the direction parallel to the scan direction of the line. In addition, the scratch detecting unit 240 may further include a one-dimensional median filter for supplementing the erroneous ridge detection by the Gaussian first-derivative filter.

The restoration processing unit 250 confirms if the width of the scratch region detected by the scratch detecting unit 240 is not less than a predetermined value (S1410). The restoration processing unit 250 performs the restoration of the scratch region by interpolation if the width of the scratch region detected by the scratch detecting unit is less than a predetermined value (S1412) and, if the width thereof is not less than the predetermined value, does not perform the restoration of the scratch region, but provides the printing unit 260 with the scan image. The restoration processing unit 250 may include a linear interpolator which performs a restoration by linear interpolation which connects linearly predetermined pixel information to restore the scratch region.

The printing unit 260 prints an image processed by the restoration processing unit 250 on paper sheet (S1414).

The message provision unit 270 may provide a warning message about foreign matter when the restoration processing unit 250 does not perform the restoration of the corresponding scratch region since the width of the scratch region detected by the scratch detecting unit 240 is not less than a predetermined value (S1418).

Figure 15:
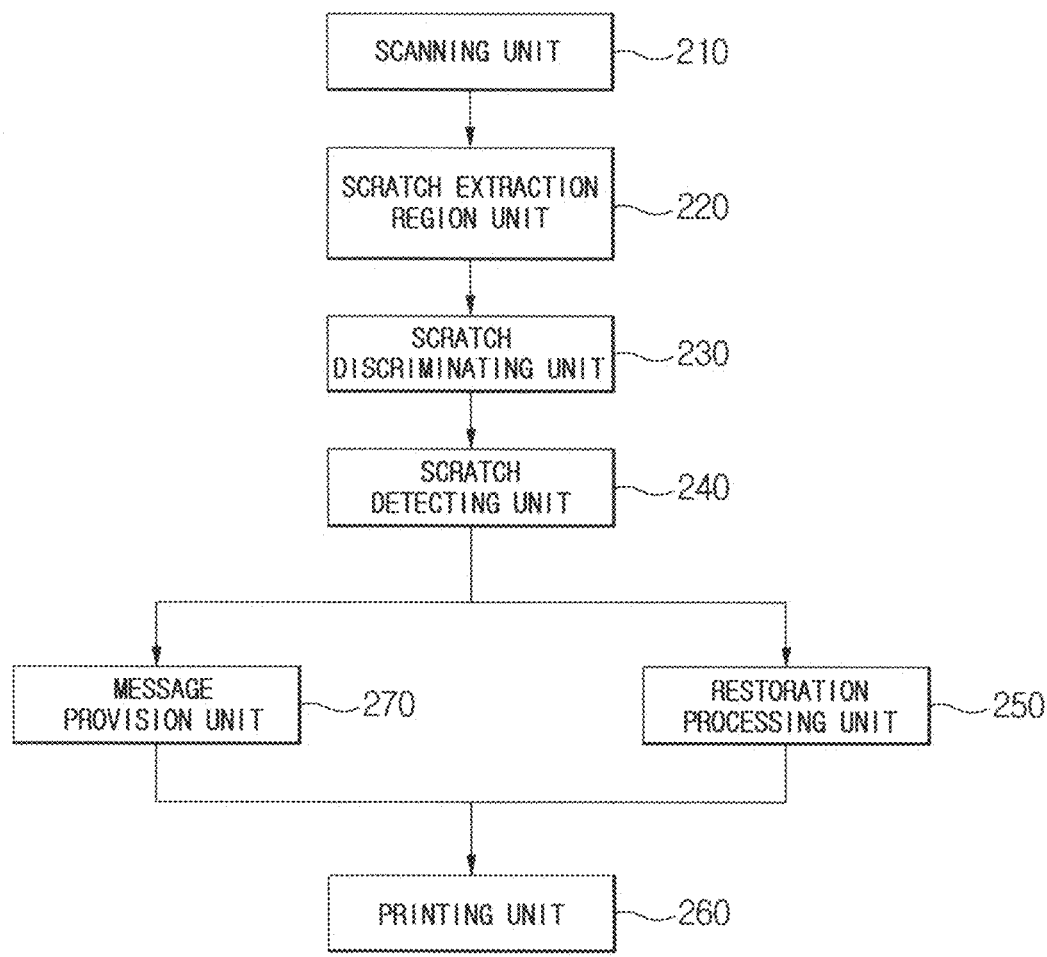
FIG. 15 illustrates a block diagram of an image correction apparatus according to another embodiment of the present invention.

FIG. 15 illustrates a block diagram of an image correction apparatus according to one embodiment of the present invention.

The image correction apparatus illustrated in FIG. 15 is the same as that illustrated in FIG. 2, except for the position of the message provision unit 270. Therefore, only the message provision unit 270 will be described here.

The message provision unit 270 may provide a warning message about foreign matter in case that the width of the scratch region detected by the scratch detecting unit 240 is not less than a predetermined value. In addition, the message provision unit 270 may further be provided with 'a continuous printing button'. If the continuous printing button is inputted, an image of a corresponding region may be provided to the printing unit 260 without the restoration of the corresponding region.

Figure 16:
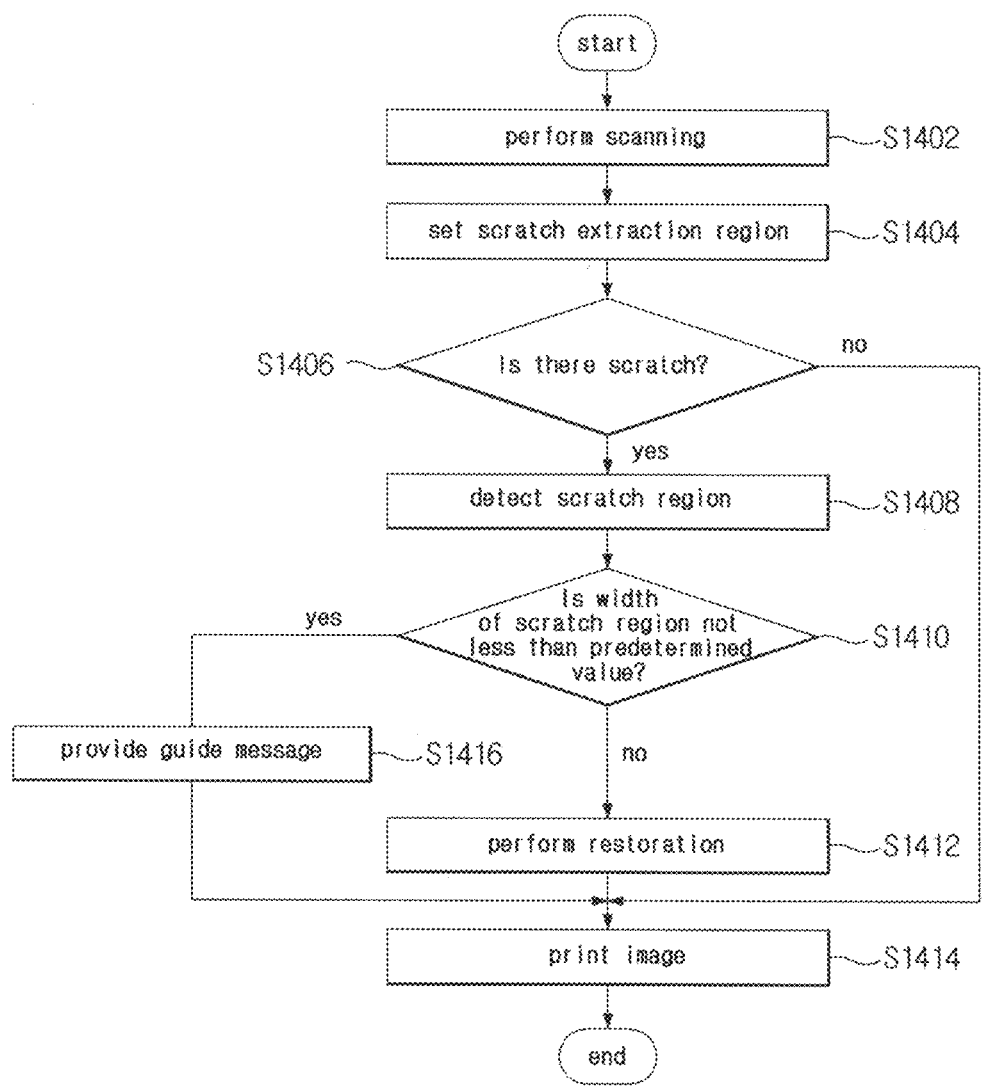
FIG. 16 illustrates a flow chart of an image correction method according to yet another embodiment of the present invention.

FIG. 16 illustrates a flow chart of an image correction method according to another embodiment of the present invention.

The image correction method illustrated in FIG. 16 is the same as that illustrated in FIG. 14 except for the step of providing a guide message. Therefore, only the step of providing a guide message will be described here.

The message provision unit 270 may provide a warning message about foreign matter in case that the width of the scratch region detected by the scratch detecting unit 240 is not less than a predetermined value (S1416). In addition, the message provision unit 270 may further be provided with 'a continuous printing button'. When the continuous printing button is inputted, an image of a corresponding region may be provided to the printing unit 260 without the restoration of the corresponding region.

The protection scope of the present invention should be interpreted based on the claims attached herein. In addition, those skilled in the art may make various modifications and variations without departing from the essential features of the present invention. Therefore, all technical concepts within the equivalent range to the present invention should be interpreted as falling within the scope of the present invention.

What is claimed is:

1. An image correction method comprising:
    a scanning step of performing scanning per line so as to obtain a scan image;
    a scratch extraction region setting step of setting a scratch extraction region in a region in which a texture does not exist on the scan image obtained by the scanning step;
    a scratch discriminating step of discriminating if there is a scratch in the scratch extraction region set by the scratch extraction region setting step and, if there is a scratch, then providing a scratch position information;
    a scratch detecting step of detecting a scratch region from a scan image scanned per line using the scratch position information provided by the scratch discriminating step;
    a restoration processing step of performing a restoration of the corresponding scratch region by interpolation if the width of the scratch region detected by the scratch detecting unit is less than a predetermined value, or not performing the restoration of the corresponding scratch region by interpolation if the width thereof is not less than the predetermined value; and
    a printing step of printing a image processed in the restoration processing step on a paper sheet.

2. The image correction method according to claim 1, wherein the scratch detecting step comprises detecting a scratch by applying a Gaussian first-derivative filter for all lines within a predetermined range having a scratch discriminated in the scratch discriminating step.

3. The image correction method according to claim 2, wherein the restoration processing step comprises performing the restoration by linear interpolation which connects linearly predetermined pixel information.

4. The image correction method according to claim 1, further comprising: a message provision step which provides a warning message about foreign matter in case that the restoration of the corresponding scratch region is not performed in the restoration processing step.

5. The image correction method according to claim 1, further comprising: a guide message provision step which provides a warning message about foreign matter if the width of the scratch region detected in the scratch detecting step is not less than a predetermined value.

6. The image correction method according to claim 5, wherein the guide message provision step provides a continuous printing button and, when the continuous printing button is inputted, provides the printing step with the scan image for which the restoration of the corresponding scratch region is not performed.

\* \* \* \* \*